United States Patent Office 3,428,699
Patented Feb. 18, 1969

3,428,699
PROCESS FOR THE PREPARATION OF LIQUID, LOW-MOLECULAR WEIGHT UNSATURATED POLYMERS
Bernhard Schleimer, Marl, Germany, assignor to Chemische Werke Huls Aktiengesellschaft, Marl, Germany, a corporation of Germany
No Drawing. Filed Sept. 9, 1966, Ser. No. 578,136
Claims priority, application Germany, Sept. 21, 1965, C 36,928
U.S. Cl. 260—669      4 Claims
Int. Cl. C07c 3/10; B01j 11/00

ABSTRACT OF THE DISCLOSURE

The known production of polybutadienes involving polymerization with the aid of mixed catalysts is improved by the use of a catalyst system prepared by reacting (1) a solution of a nickel compound in an inert diluent with (2) an alkylaluminum halide compound and then (3) adding to the reaction product, as a modifier, a compound of an element of the main groups V and VI of the periodic system, said compound having free electron pairs derived from said element.

---

The preparation of low-molecular weight, liquid polybutadienes with predominating cis-double bonds by the polymerization of butadiene with mixed catalysts of soluble compounds of nickel and organoaluminum halides, in the presence of aliphatic, cycloaliphatic, and preferably aromatic hydrocarbons as diluent is known (DAS 1,186,631, DAS 1,174,507).

Heretofore, very low molecular weight, liquid polybutadienes with viscosities below 500 centipoise at 50° C. could be prepared only with Al/Ni ratios of <10:1 and at reaction temperatures near 0° C. and with aromatic compounds or aromatic/aliphatic compound mixtures being the only usable diluents.

It has been found that it is feasible to prepare, in an advantageous manner, low-molecular weight, liquid polybutadienes, low-molecular weight liquid butadiene/diene and low-molecular weight liquid butadiene/styrene copolymers with predominantly intermediate double bonds and viscosities ranging from 50 to 30,000 centipoise (50° C.) by polymerization of butadiene or copolymerization of butadiene and conjugated diolefines having more than 4 carbon atoms, or copolymerization of butadiene and styrene or substituted styrenes in inert diluents in the presence of mixed catalysts formed by reacting nickel compounds soluble in said diluents with alkylaluminum halides of the formula $R_nAlX_{(3-n)}$, in which R represents hydrogen, an alkyl, aryl or alkylaryl residue with 1 to 12 carbon atoms, X stands for halogen and $n$ stands for a number from .5 to 2.5, provided that the process is carried out in the presence of compounds of the elements of the main groups V and VI of the periodic system, said compounds having free electron pairs being derived from said elements.

In comparison with the current state of art the process of the invention offers the following significant advantages:

(1) The addition of the compounds with free electron pairs of the elements of the main groups V and VI of the periodic system causes a significant decrease in molecular weight and viscosity with, in many instances very substantial, savings of the valuable nickel component.

(2) It is feasible also to use halogen substituted hydrocarbons at room temperature as diluents.

The mixed catalysts suitable for the process of the invention are for the first part nickel compounds which are soluble in the diluents, for example the nickel salts of organic acids such as nickeloctoate, nickelstearate, nickeloleate and nickelnaphthenate, also the complex compounds of the nickel such as nickel-(II)-acetylacetonate, nickel-(II)-benzoylacetonate, bis-(cyclopentadienyl)-nickel, bis-(cyclopentadiene)-nickel, bis-(cyclooctadiene)-nickel, bis-(acrolein)-nickel, diallyl-nickel, bis-(cyclododecatriene)-nickel, bis-(triphenylphosphine)-nickel, and nickelcarbonyl.

For the second part the mixed catalysts contain aluminum halides of the formula $R_nAlX_{(3-n)}$ in which R represents alkyl, alkylaryl or aryl residues with 1 to 12 carbon atoms, X stands for a halogen and $n$ stands for a number from .5 to 2.5.

Particularly suitable are alkyl-aluminum dihalides and dialkyl-aluminum halides in which the alkyl can be methyl, ethyl, propyl, n-butyl, iso-butyl, n-octyl, dodecyl and phenyl and in which the halogen can be chlorine, bromine or iodide.

More suitable are mixtures of these substances, for example ethylaluminumsesquichloride and also mixtures of trialkyl-, triaryl-, or trialkylaryl-aluminum compounds, dialkyl-, diaryl- or dialkylaryl-aluminum halides on one part and alkyl-, alkylaryl- or aryl-aluminum dihalides or auminum trihalides on the other part, provided the mean number of the halogen atoms per aluminum atom, and also the number of the alkyl, aryl or alkylaryl groups ranges from .5 to 2.5, and preferably near 1.5.

Usable are also aluminum hydrides, for example in the form of lithium-aluminum hydride, or sodium-aluminum hydride mixed with the above mentioned alkylaluminum halides. Finally, it is also possible to employ aluminumhydridehalides and their etherates, for example aluminum-hydride-chloride-etherate alone or mixed with the above mentioned aluminum compounds.

The mixed catalysts should contain, per mol of the aluminum compound, 1 to .001, preferably .5 to .005 mol of the nickel compound.

The aluminum compound is employed in quantities ranging from .0001 to .5, and preferably from .001 to .05 mol per mol of butadiene, or butadiene/diene or butadiene/styrene mixture.

Suitable compounds with free electron pairs of the elements of main groups V and VI are those of nitrogen, phosphorus, sulphur and oxygen. Particularly suitable is the use of ammonia and amines such as aniline, methylamine, diethylamine, triethylamine, dimethylaniline, dimethylformamide, heterocyclic nitrogen compounds such as pyridine, quinoline, piperazine, morpholine, pyrrole, phenthiazine, azo- and hydrazo-compounds such as azobenzene and hydrazobenzene, compounds of sulphur such as thiophene, diphenylsulphide, diethylsulphide, thionaphthene, dimethylsulphoxide, ethers such as anisole, dioxane, tetrahydrofuran, diethylether as well as phosphines, for example triphenylphosphine.

These modifiers have a deactivating influence on the catalyst and as a consequence thereof will cause a lowering of the viscosity, or molecular weight respectively, of the polymers. The deactivating influence on the catalyst will become excessive if the atomic equivalents of the atoms with free electron pairs in the compounds employed as modifiers (for example nitrogen in aniline-external modifier) increased by the atomic equivalents of the atoms with free electron pairs in the co-catalyst proper (for example oxygen in the acetylacetonyl residue of the nickel-(III)-acetylacetonate-internal modifier) exceeds the atomic equivalent of the aluminum of the aluminum-organic compound present in the catalyst. In this case a decrease in the yield will become apparent.

The borderline for such decrease in the yield will be a molar ratio of the aluminum-organic compound to the compounds with free electron pairs of approximately 1:1. As a rule, molar ratios of 1:<.75 are employed.

The lower limit of any appreciable lowering in viscosity or saving of nickel by adding a modifier will be reached in connection with nitrogen compounds approximately at a molar ratio of 1:.005. However, as a rule ratios of 1:>.01 are used. In case of the less basic compounds of phosphorus, sulphur and oxygen, the lower limit will be approximately at a molar ratio of 1:.01, and preferably at 1:>.05.

Higher concentrations of modifiers are required for the polymerization in chlorinated hydrocarbons used as diluents in order to prevent the liquid unsaturated polymers from cross-linking into solid products. In this case molar ratios of the Al-organic compound to nitrogeneous modifiers of 1:>.05, and usually 1:>.1 are required.

In case of less basic modifiers, for example the phosphines and the sulphur and the oxygen compounds, molar ratios of 1:>.075, and preferably 1:>.2, are preferred.

The halogen content of the aluminum-organic compound also plays a role and will influence the molar ratio of Al-organic compound:modifier needed to attain a specific, desired effect of viscosity-lowering of the polymerizate. In the order $Al(R)_2X < Al(R)_{1.5}X_{1.5} < Al(R)X_2$ it is necessary to employ increasing concentrations of compounds with free electron pairs in order to neutralize the rising Friedel-Crafts activity of the catalyst which would lead to higher viscosities of the liquid polymer.

The average molecular weights are affected further by the catalyst concentration, the polymerization temperature, the diluent and the water content of the diluent. Diluent mixtures will result in lower average molecular weights in comparison with use of pure diluents; higher water concentration in the diluent as well as higher polymerization temperature will increase molecular weights, and as a consequence thereof also the viscosity. Finally, the purity of the monomers employed will also have a bearing on the average molar weight of the polymers. If the monomers contain acetylenes or allenes, for example butine-(1), propadiene or butadiene-(1,2), the average molar weights will decrease with rising concentrations of such compounds. It is also possible to admix these substances to the monomers if an additional control of the molar weights is desired.

Suitable diluents are aliphatic, cycloaliphatic and aromatic hydrocarbons with 4 to 12 carbon atoms such as butane, pentane, hexane, cyclohexane, isopropylcyclohexane, benzine fractions, benzene toluene, xylene. It is also possible to employ any mixtures of these hydrocarbons, for example benzene/hexane, preferably at a proportion ranging from 1:1 to 3:1.

The process of the invention permits also the use of halogenated hydrocarbons as the diluent, for example carbon tetrachloride, chloroform, methylenechloride (dichloromethane), methylchloride, n-butylchloride, n-amylchloride as well as chloro-hydrocarbons in which the halide stands at a double bond, for example tetrachloroethylene and chlorobenzene. The chlorine compounds can be replaced by the corresponding bromo-, iodo- or fluorohydrocarbons to act as diluents, provided their use is feasible in economic respect.

It is known from references found in the literature that such halogenated hydrocarbons are inert to alkyl-aluminumchlorides only at temperatures at and below 0° C. (H. Reinheckel, Angewandte Chemie 75, 1205 and 1206 (1963)). The process of the invention however permits the preparation of liquid polymers in the above listed halogenated hydrocarbons also at room temperature and at Al/Ni ratios of >20:1. This is often advantageous, especially if the liquid polybutadienes are to be processed further in chlorinated hydrocarbons, for example in case of the epoxidation of the liquid unsaturated polymer which can then be carried out immediately after de-activation of the catalyst in the polymer solution.

The diluents are employed in a quantity between .1 and 20 times, preferably between .5 and 5 times, and usually 2 times the quantity of the monomers.

The polymerization is carried out mostly at room temperature but can take place also at higher or lower temperatures ranging from −30° C. to +100° C. Normally, operations are performed at atmospheric pressure, or pressures up to 10 atmospheres, the latter being used primarily in case of reaction temperatures in excess of 40° C.

The process is suitable not only for the homopolymerization of butadiene but also for the co-polymerization of butadiene with 1,3-diolefines having more than 4 carbon atoms such as isoprene, 2-phenylbutadiene-(1,3), pentadiene-(1,3), 2-ethylbutadiene-(1,3), 2-methylpentadiene-(1,3), hexadiene-(1,3), 4-methylhexadiene-(1,3), heptadiene-(1,3) and similar compounds, also with multiple olefines in which two of the double bonds are conjugated such as 2-methyl-6-methyleneoctadiene-(2,7) and 2,6-dimethyloctatriene-(1,5,7). It is suitable also for the co-polymerization of butadiene with styrene or substituted styrenes such as o-, m- and p-alkylstyrene, the corresponding dialkylstyrenes, o-, m- and p-halogen-styrenes, the di-, tri-, tetra- and penta-halogenstyrenes, divinylbenzene and allylbenzene.

Water and/or oxygen should be present during the polymerization, if at all, only in quantities which are negligible compared with the quantity of alkylaluminum compound. It will therefore be expedient to work under indifferent gases such as nitrogen, argon or methane and to employ solvents and monomers free of water.

In case of batchwise polymerization of the components of the reaction mixture are placed into the reaction vessel in the following sequence:

(1) Solvent
(2) Nickel compound
(3) Traces of a diolefin, preferably butadiene
(4) Alkylaluminumchloride compound
(5) Electron-yielding compound
(6) Butadiene or butadiene/styrene or butadiene/diolefin.

The addition of the alkylaluminumchloride to the nickel compound dissolved in the diluent is carried out preferably in the presence of a small amount of a multiple-unsaturated carbon compound, for example butadiene, isoprene, piperylene, dimethylbutadiene, cyclooctadiene, cyclododecatriene or the like. The modifier is then added drop by drop and the monomers are thereupon introduced gradually into the reaction chamber either separately or in mixture, in liquid and/or gaseous state. Usually, the butadiene is introduced in gaseous form and the diolefin or styrene, containing more than 4 carbon atoms, is added gradually in liquid form.

If the process is carried out continuously, the catalyst is prepared in a mixing vessel from the nickel and the aluminum compounds in the presence of the diluent and of traces of an unsaturated hydrocarbon, preferably butadiene, and the modifier is then added drop by drop. Thereupon the catalyst solution is delivered continuously to the polymerization chamber.

The polymer solutions so obtained are then further processed in known manner. First, it will be advantageous to decompose the mixed catalyst by means of alcohols and ketones. The content of solids, that is the quantity of low-molecular, liquid polymers in the inactivated polymer solution, can range up to 90% by weight, depending on the specific conditions of the polymerization and will normally vary between 25 and 60% by weight.

The inactivated polymer solution is washed in a stirrer vessel with desalted or distilled water, preferably at a temperature above 50° C., in order to remove catalyst residues. The washing effect of the water can be increased by the addition of inorganic or organic acids or bases. Acetic acid of .01 to 5% has been found to be suitable but such acids can also be used in a more diluted or concentrated form.

The water is separated from the polymer solution in a settling vat. The liquid polymer is then freed of the diluent and any traces of water in a rotary vacuum evaporator or a vacuum film evaporator.

The polymerization and the further processing can be carried out also on a continuous basis.

The low-molecular, liquid polymers obtained by the process have average molecular weights between 500 and 50,000 and viscosities between 50 and 30,000 centipoise at 50° C. (determined in the Hoepler dropping ball viscometer in accordance with Haake) depending on the reaction conditions selected for the preparation of the polymers.

At least 95% of the double bonds in the liquid polymers, prepared in accordance with the process of the present invention, are centrally positioned and 65% of these—at least—have the cis-configuration.

The iodine value of the polymers so prepared is at least 90% of the computed value.

The process attains a substantial saving of the nickel compound and makes feasible the use of halogenated hydrocarbons such as carbon tetrachloride as dilutents.

The low molecular weight, liquid, unsaturated polymers prepared in accordance with the process of the invention can be used for a variety of industrial purposes, for example as plasticizers for rubber, for the manufacture of films, coatings and molded masses which can be hardened by cross-linkage, and also as self-drying oils or as admixtures to other drying oils. The unsaturated polymers can be easily epoxidized, add on halogens and halogen hydrides, can be hydrogenated, give diene- and ene-syntheses and will lead therefore to other industrially usable products.

Example 1

With exclusion of atmospheric oxygen and humidity the catalyst was prepared at room temperature in a 2-liter reaction vessel which was filled with 1000 ml. of carbon tetrachloride containing 8.0 p.p.m. of water under nitrogen circulation by the addition of .257 g. (1 mmol) of nickel-(II)-acetylacetonate and dropwise addition of 7.42 g. (60 mmol) of ethylalminumsesquichloride in the presence of traces of butadiene, and then there was added to the reaction solution .657 g. (9 mmol) of diethylamine dissolved in 20 ml. of carbon tetrachloride. Over a period of five hours there was introduced continuously, at a temperature of 25° C. and under stirring 432 g. (8 mol) of butadiene in gaseous form, which butadiene contained, at a purity of 99.6 mol percent, as principal impurities .01 mol percent of butadiene-(1,2), .01 mol percent of propadiene and .02 mol percent of ethylacetylene, also .35 mol percent of 1-iso-butene, .02 mol percent of trans-butene, .01 mol percent of cis-butene, .04 mol percent of n-butane and .01 mol percent of propylene. Stirring was continued for another hour and the catalyst was then decomposed by use of 20 ml. of methanol.

The carbon tetrachloride solution was then precipitated four times, each time with two liters of .2% acetic acid in order to remove the catalyst residues. The .2% acetic acid, being of less specific weight, was decanted each time after settling of the carbon tetrachloride solution.

Thereupon the carbon tetrachloride together with any remaining traces of the acetic acid was removed by distillation in a rotary vacuum evaporator. The yield was 350 g. (81% of the theoretical value) of a liquid polybutadiene with a viscosity of 1220 centipoise at 50° C., measured in the Hoepler dropping ball viscometer in accordance with Haake. The iodine number was 430 (94% of the theoretically possible value). The infrared analysis disclosed that the liquid polybutadiene contained 19% of centrally-positioned trans- and 80% of centrally-positioned cis- and <1% of vinyl-double bonds. The molecular weight was 2450 (vapor pressure osmometer), the density (50/4): .8955 and the refractive index ($n_D^{20}$): 1.5230.

Examples 2, 3 and 4

Table 1, following, which lists Examples 2, 3 and 4 as well as—for purposes of comparison—Example 1, demonstrates the relationship between the viscosity of the liquid polybutadienes and the quantity of the admixed diethylamine if other conditions of the polymerization are kept identical with the conditions described in Example 1.

TABLE 1

| Examples | 2 | 3 | 1 | 4 |
|---|---|---|---|---|
| Ethylaluminumsesquichloride, mmol | 60 | 60 | 60 | 60 |
| Aluminum/nickel ratio | 60:1 | 60:1 | 60:1 | 60:1 |
| Diethylamine, mmol | | | 4.5 | 9.0 | 13.5 |
| Yield in percent | (1) | (2) | 81 | 77 |
| Viscosity (cp./50° C.) | | | 1,220 | 230 |
| Molecular weight (vapour pressure osmometer) | | | 2,450 | 1,950 |
| Density (d 50/4) | | | 0.8955 | 0.8974 |
| Iodine number | | | 430 | 443 |
| Refractive index ($n_D^{20}$) | | | 1.5238 | 1.5224 |
| Double bonds in percentages: | | | | |
| Trans- | | | 19 | 18 |
| Cis- | | | 80 | 81 |
| Vinyl- | | | 1 | 1 |

[1] Solid polymer—After introduction of 108 g. of butadiene (90 minutes after the start of the polymerization) the liquid polymer which had formed up to this time became high-molecular suddenly and precipitated from the solution.
[2] Solid polymer—After introduction of 365 g. of butadiene (210 minutes after the start of the polymerization) the liquid polymer which had formed up to this time became high-molecular suddenly and precipitated from the solution.

Table 1 demonstrates that at an aluminum-nickel ratio of 60:1, a reaction temperature of 25° C., and in carbon tetrachloride as the diluent the forming of high-molecular weight polybutadiene is prevented by the admixture of diethylamine.

Examples 5, 6, 7 and 8

Table 2 which lists Examples 5, 6, 7 and 8 demonstrates the relationship between the viscosity of the liquid polybutadiene and the quantity of the admixed anisole, used in place of the diethylamine, if other conditions of the polymerization are kept identical with the conditions as described in Example 1.

TABLE 2

| Examples | 5 | 6 | 7 | 8 |
|---|---|---|---|---|
| Ethylaluminumsesquichloride, mmol | 60 | 60 | 60 | 60 |
| Aluminum/nickel ratio | 60:1 | 60:1 | 60:1 | 60:1 |
| Anisole, mmol | 9.0 | 13.5 | 18 | 22.5 |
| Yield in percent | (1) | (2) | 81.3 | 74.7 |
| Viscosity, (cp./50°C.) | | | 420 | 290 |
| Molecular weight (vapour pressure osmometer) | | | 2,570 | 2,200 |
| Density (d 50/4) | | | 0.8945 | 0.8957 |
| Iodine number | | | 452 | 440 |
| Refractive index ($n_D^{20}$) | | | 1.5236 | 1.5227 |
| Double bonds in percentages: | | | | |
| Trans- | | | 18 | 17 |
| Cis- | | | 81 | 82 |
| Vinyl- | | | 1 | 1 |

[1] After introduction of 130 g. of butadiene (100 minutes after the start of the polymerization) the liquid polymer which had formed up to this time became high-molecular suddenly and precipitated from the solution.
[2] After introduction of 290 g. of butadiene (200 minutes after the start of the polymerization) the liquid polymer which had formed up to this time became high-molecular suddenly and precipitated from the solution.

Table 2 demonstrates, in analogy to Table 1, that the forming of solid polybutadiene is likewise prevented if anisole is added.

Examples 9, 10, 11, 12, 13

Table 3 below which lists Examples 9, 10, 11, 12 and 13 demonstrates the relationship between the viscosity of the liquid polybutadiene and the quantity of the admixed aniline, used in place of the diethylamine, if other conditions of the polymerization are kept identical with the conditions as described in Example 1.

TABLE 3

| Examples | 9 | 10 | 11 | 12 | 13 |
|---|---|---|---|---|---|
| Ethylaluminumsesquichloride, mmol | 60 | 60 | 60 | 60 | 60 |
| Aluminum/nickel ratio | 60:1 | 60:1 | 60:1 | 60:1 | 60:1 |
| Aniline, mmol | | | 4.5 | 9.0 | 13.5 |
| Yield in percent | (1) | (2) | 73 | 75 | 76.5 |
| Viscosity, cp./50° C | | | 402 | 427 | 324 |
| Molecular weight (vapour pressure osmometer) | | | 2,250 | 2,250 | 2,120 |
| Density ($d$ 50/4) | | | 0.8957 | 0.8968 | 0.8950 |
| Iodine number | | | 432 | 423 | 442 |
| Refractive index ($n_D^{20}$) | | | 1.5242 | 1.5252 | 1.5238 |
| Double bonds in percentages: | | | | | |
| Trans- | | | 18 | 19 | 16 |
| Cis- | | | 81 | 80 | 83 |
| Vinyl- | | | 1 | 1 | 1 |

[1] After introduction of 95 g. of butadiene (80 minutes after the start o the polymerization) the liquid polymer which had formed up to this time became high-molecular suddenly and precipitated from the solution.
[2] After introduction of 400 g. of butadiene (255 minutes after the start of the polymerization) the liquid polymer which had formed up to this time became high-molecular suddenly and precipitated from the solution.

Table 3 demonstrates, in analogy to Tables 1 and 2, that the forming of solid polybutadiene is likewise prevented if aniline is added.

Example 14

With exclusion of oxygen and humidity of the atmospheric air the catalyst was prepared at room temperature in a 2-liter reaction vessel which was filled with 1000 ml. of benzene, containing 35.5 p.p.m. of water, under nitrogen circulation by the addition of .1028 g. (.4 mmol) of nickel-(II)-acetylacetonate and dropwise addition of 4.96 g. (40 mmol) of ethylaluminumsesquichloride in the presence of traces of butadiene. Then there was introduced continuously over a period of five hours at a temperature of 25° C. under stirring in gaseous form 432 g. (8 mol) of butadiene which contained, at a purity of 99.6 mol percent, as principal impurities .01 mol percent of propadiene, .02 mol percent of ethylacetylene, .35 mol percent of 1-iso-butene, .01 mol percent each of trans- and cis-butene, .01 mol percent of propylene and .02 mol percent of butene. The stirring was then continued for another hour and thereafter the catalyst was decomposed with 20 ml. of methanol.

The benzene polymer solution was then precipitated four times, each time with two liters of 0.2% acetic acid at 80° C. in order to remove the catalyst residues. The diluted acetic acid was decanted each time after settling of the benzene polymer solution. Thereupon the benzene and any remaining traces of the acetic acid were removed by distillation in a rotary vacuum evaporator. The yield was 180 g. (41.6% of the theoretical value) of a liquid polybutadiene with a viscosity of 14,980 centipoise at 50° C., measured in the Hoepler dropping ball viscometer in accordance with Haake. The iodine number was 466 (99% of the theoretically possible value). The infra-red analysis showed that the liquid polybutadiene contained 8% of centrally-positioned trans-, and 91% of centrally-positioned cis- as well as <1% of vinyl-double bonds. The molecular weight was 13,500 (vapour pressure osmometer), the density ($d$ 50/4: .8932 and the refractive index ($n_D^{20}$): 1.5243.

Examples 15, 16, 17 and 18

Table 4, below, which lists Examples 15, 16, 17 and 18 as well as—for purposes of comparison—Example 14, demonstrates the relationship between the viscosity of the liquid polybutadiene and the quantity of the admixed aniline if other conditions of the polymerization are kept identical with the conditions as described in Example 14.

TABLE 4

| Examples | 14 | 15 | 16 | 17 | 18 |
|---|---|---|---|---|---|
| Ethylaluminumsesquichloride, mmol | 40 | 40 | 40 | 40 | 40 |
| Aluminum/nickel ratio | 100:1 | 100:1 | 100:1 | 100:1 | 100:1 |
| Aniline, mmol | | 4.5 | 9.0 | 18.0 | 27.0 |
| Yield in percent | 41.6 | 74.8 | 77.1 | 51.6 | 38.3 |
| Viscosity (cp./50° C.) | 14,980 | 10,500 | 3,100 | 788 | 540 |
| Molecular weight (vapour pressure osmometer) | 13,500 | 9,500 | 5,500 | 4,800 | 3,600 |
| Density ($d$ 50/4) | 0.8932 | 0.8899 | 0.8890 | 0.8869 | 9.8885 |
| Iodine number | 466 | 460 | 462 | 471 | 467 |
| Refractive index ($n_D^{20}$) | 1.5243 | 1.5241 | 1.5240 | 1.5230 | 1.5230 |
| Double bonds in percentages: | | | | | |
| Trans- | 8 | 10 | 11 | 11 | 1 |
| Cis- | 91 | 88 | 87 | 87 | 8 |
| Vinyl- | 1 | 2 | 2 | 2 | |

Examples 19, 20, 21 and 22

Table 5 below which lists Examples 19, 20, 21 and 22 demonstrates the relationship between the viscosity of the liquid polybutadiene and the quantity of the admixed aniline. The polymerization was accomplished in analogy to the conditions set forth in Example 14, the only difference being that .257 g. (1 mmol) of nickel-(II)-acetylacetonate and 7.42 g. (60 mmol) of ethylaluminumsesquichloride (aluminum-nickel-ratio of 60:1) was used as catalyst.

TABLE 5

| Examples | 19 | 20 | 21 | 22 |
|---|---|---|---|---|
| Ethylaluminumsesquichloride, mmol | 60 | 60 | 60 | 60 |
| Aluminum/nickel-ratio | 60:1 | 60:1 | 60:1 | 60:1 |
| Aniline, mmol | | 4.5 | 9.0 | 13.5 |
| Yield in percent | 86.8 | 75.6 | 79.4 | 76.6 |
| Viscosity (cp./50° C.) | 7,700 | 3,100 | 1,550 | 1,090 |
| Molecular weight (vapour pressure osmometer) | 7,500 | 5,250 | 4,550 | 3,030 |
| Density ($d$ 50/4) | 0.8933 | 0.8914 | 0.8915 | 0.8896 |
| Iodine number | 456.5 | 463 | 457 | 452.5 |
| Refractive index ($n_D^{20}$) | 1.5250 | 1.5247 | 1.5245 | 1.5230 |
| Double bonds in percentages: | | | | |
| Trans- | 14 | 16 | 16 | 15 |
| Cis- | 85 | 83 | 83 | 84 |
| Vinyl- | 1 | 1 | 1 | 1 |

Example 23

With exclusion of the oxygen and humidity of the atmospheric air the catalyst was prepared at room temperature in a 2-liter reaction vessel which was filled with 1000 ml. of chloroform, containing 18 p.p.m. of water, under nitrogen circulation by the addition of .257 g. (1 mmol) of nickel-(II)-acetylacetonate and the drop-wise addition of 7.4 g. (60 mmol) of ethylaluminumsesquichloride (Al/Ni ratio of 60:1) in the presence of traces of butadiene and subsequent addition drop-wise of .93 g. (10 mmol), of aniline dissolved in 20 ml. of chloroform, into the reaction solution. Thereafter there was introduced continuously over a period of five hours at a temperature of 25° C. in gaseous form and under stirring 432 g. (8 mol) of butadiene of the quality described in Example 1. The stirring was then continued for another hour and thereafter was decomposed by use of 20 ml. of methanol.

The chloroform solution was then precipitated four times, each time with two liters of a .01% acetic acid to remove the catalyst residues. The acetic acid, being of less specific weight, was decanted each time after the settling of the chloroform solution. Thereupon the chloroform together with any remaining traces of the diluted acetic acid was removed by distillation in a rotary vacuum evaporator. The yield was 353 g. (81.7% of the thoretical value) of a liquid polybutadiene with a viscosity of 980 centipoise at 50° C., measured in the Hoepler dropping ball viscometer. The iodine number was 441 (93.8% of the theoretically possible value). The infra-red analysis showed that the liquid polybutadiene contained 19% of centrally-positioned trans-, and 80% of centrally-positioned cis- as well as <1% of vinyl-double bonds. The molecular weight was 3100 (vapour pressure osmometer), the density (50/4): 0.8947 and the refractive index ($n_D^{20}$): 1.5258.

Example 24

For purposes of comparison the polymerization was carried out under conditions analogous to Example 23, the only difference being that the catalyst was not modified by aniline.

After introduction of 160 g. (37% of the total amount intended for use) of the butadiene (105 minutes after the start of the polymerization) the liquid polymer which had formed up to this time became high-molecular suddenly and precipitated from the solution. The polymerization process was then concluded.

Example 25

With exclusion of oxygen and humidity of the atmospheric air the catalyst was prepared at room temperature in a 2-liter reaction vessel which was filled with 1000 ml. of benzene with a 25 p.p.m. water content under nitrogen circulation by the addition of .69 g. (2 mmol) of nickel-(II)-octoate and the drop-wise addition of 7.23 g. (60 mmol) of diethylaluminumchloride (Al/Ni ratio of 30:1) in the presence of traces of butadiene, and subsequent addition drop by drop into the reaction solution of .93 g. (10 mmol) of aniline diluted with 20 ml. of benzene. Over a period of five hours and at 25° C. 432 g. (8 mol) of butadiene of a purity as described in Example 1 was introduced in gaseous form. The stirring was continued for another ½ hour and the catalyst was then decomposed by use of 20 ml. of methanol. The polymerization product was then precipitated by methanol from the benzene solution and the benzene-methanol mixture was decanted. The liquid polybutadiene was then stirred twice, each time with one liter of methanol to remove the catalyst ash and thereupon freed of any remaining methanol and traces of benzene in a vacuum film evaporator.

The yield was 330 g. (75.3% of the theoretical value) of a liquid polybutadiene with a viscosity of 380 centipoise at 50° C., measured by the Hoepler dropping ball viscometer in accordance with Haake. The iodine number was 470 (100% of the theoretically possible value). The infra-red analysis showed that the liquid polybutadiene contained 23% of centrally-positioned trans-, and 76% of centrally-positioned cis- as well as <1% of vinyl-double bonds. The molecular weight was 2300 (vapour pressure (osmometer), the refractive index ($n_D^{20}$): 1.5223 and the density ($d\ 50/4$): 0.8915.

Example 26

For the purpose of comparison the polymerization was carried out under conditions analogous to Example 25, the only difference being that the catalyst was not modified by the use of aniline.

The yield was 304 g. (71.0% of the theoretical value) of a liquid polybutadiene with a viscosity of 960 centipoise at 50° C., measured by the Hoepler dropping ball viscometer in accordance with Haake. The iodine number was 465 (98.9% of the theoretically possible value). The infra-red analysis showed that the liquid polybutadiene contained 18% of centrally-positioned trans-, and 81% of centrally-positioned cis- as well as <1% of vinyl-double bonds. The molecular weight was 2980 (vapour pressure osmometer), the refractive index ($n_D^{20}$): 1.5245 and the density ($d\ 50/4$): 0.8920.

Example 27A

With exclusion of oxygen and humidity of the atmospheric air the catalyst was prepared at +5° C. in a 150-liter polymerization vessel which was filled with 60.0 kg. (68.3 liter) of benzene with a 20 p.p.m. water content under nitrogen circulation by the addition of 192.6 g. (.75 mol) of nickel-(II-)-acetylacetonate and 372.8 g. (3.0 mol) of ethylaluminumsesquichloride in the presence of 6.0 kg. of butadiene. Then there was introduced in gaseous form continuously (4 kg. per hour) over a period of 6 hours under stirring and at a polymerization temperature of +5° C., 24.0 kg. of butadiene which contained at a purity of 99.4% .04 mol percent of butadiene-(1,2), 0.1 mol percent of propadiene, .01 mol percent of ethylacetylene, .32 mol percent of 1-iso-butene, .03 mol percent of trans-butene, .02 mol percent of cis-butene, 0.17 mol percent of n-butane and .01 mol percent of propylene. The stirring was continued for another ½ hour and the catalyst was then decomposed by one liter of methanol. A butadiene conversion of 99.0% was attained, the solid-content of the benzene polymer solution was 33.1%.

In order to remove the residues of the catalyst the benzene polymer solution was then emulsified in a pass-through mixer with a .02% acetic acid heated to 70 to 80° C., (ratio of .02% acetic acid:polymer solution=1:1). The emulsion was then conveyed into a settling tank and separated quickly into the aqueous and the polymer-containing benzene phase. Finally, the liquid polybutadiene was freed of the benzene in a film evaporator.

The yield was 26.4 kg. (88.0% of the theoretical value) of a liquid polybutadiene with a viscosity of 520 centipoise at 20° C., measured by the Hoepler dropping ball viscometer in accordance with Haake. The iodine number was 462 (98% of the theoretically possible value). The infra-red analysis showed that the liquid polybutadiene contained 20% of centrally-positioned trans-, 79% centrally-positioned cis- as well as <1% of vinyl-double bonds. The molecular weight was 1250 (vapour pressure osmometer) and the density ($d\ 50/4$): 0.8911.

Example 27B

The polymerization was carried out under conditions analogous to the conditions described in Example 27A, the only difference being that only 64.2 g. (.25 mol) instead of 192.6 g. (.75 mol) of the nickel-(II)-acetylacetonate was used and that the polymerization temperature was held to 25° C. instead of 5° C. The yield was 26.9 kg. 89.6% of the theoretical value) of a liquid polybutadiene with a viscosity of 2450 centipoise at 20° C., measured by the Hoepler dropping ball viscometer in accordance with Haake. The iodine number was 459 (97% of the theoretically possible value). The infra-red analysis showed that the liquid polybutadiene contained 14% of centrally-positioned trans-, 85% of centrally-positioned cis- as well as <1% of vinyl-double bonds. The molecular weight was 3400 (vapour pressure osmometer) and the density ($d\ 50/4$): 0.8902.

Example 27C

The polymerization was carried out under conditions analogous to the conditions described in Example 27B, the only difference being that the catalyst was modified by 83.7 g. (.0 mol) of aniline.

The yield was 26.5 kg. (88.3% of the theoretical value) of a liquid polybutadiene with a viscosity of 832 centipoise at 20° C., measured by the Hoepler dropping ball viscometer in accordance with Haake. The iodine number was 465 (98% of the theoretically possible value). The infra-red analysis showed that the liquid polybutadiene contained 19% of centrally-positioned trans-, 80% of centrally-positioned cis- as well as <1% of vinyl-double bonds. The molecular weight was 1900 (vapour pressure osmometer) and the density ($d\ 50/4$): 0.8906.

Example 27D

The polymerization was carried out under conditions analogous to the conditions described in Example 27C, the only difference being that there was used as diluent in place of 60 kg. (68.3 liter) of benzene a mixture of 45.0 kg. (51.7 liter) of benzene and 11.7 kg. (17.3 liter) of hexane (proportion by volume 3:1).

The yield was 25.8 kg. (86.0% of the theoretical value) of a liquid polybutadiene with a viscosity of 535 centipoise at 20° C., measured by the Hoepler dropping ball viscometer in accordance with Haake. The iodine number was 455 (96% of the theoretically possible value). The infra-red analysis showed that the liquid polybutadiene contained 21% of centrally-positioned trans-, and 78% of centrally-positioned cis- as well as <1% of vinyl-double bonds. The molecular weight was 1280 (vapour pressure osmometer) and the density (d 50/4): 0.8910.

Example 27E

The polymerization was carried out under conditions analogous to the conditions described in Example 27D, the only difference being that the catalyst was not modified by use of aniline.

The yield was 24.3 kg. (81% of the theoretical value) of a liquid polybutadiene with a viscosity of 1970 centipoise at 20° C., measured by the Hoepler dropping ball viscometer in accordance with Haake. The iodine number was 451 (95% of the theoretically possible value). The infra-red analysis showed that the liquid polybutadiene contained 15% of centrally-positioned trans- and 84% centrally-positioned cis- as well as <1% of vinyl-double bonds. The molecular weight was 2800 (vapour pressure osmometer) and the density (d 50/4): 0.8904.

The tests 27A to 27E are summarized in Table 6 shown below. A comparison of tests 27B with 27C and 27E with 27D demonstrates that by the modification of the catalyst with aniline the viscosity of the liquid polybutadiene was lowered by approximately 25 to 35%; the comparison of test 27A with 27C and 27D shows that by the modification of the catalyst with aniline liquid polybutadienes with identically low viscosities were obtained even though two-thirds of the originally used nickel-(II)-acetylacetonate (test 27A) was saved while at the same time the polymerization temperature was increased by 20° C., namely from +5° to +25° C.

TABLE 6

| | Ethylaluminumsesquichloride, percent by weight [1] | Nickel-(II)-acetylacetonate, percent by weight [1] | Al/Ni ratio, Molar ratio | Diluent (68.1) | Aniline, percent by weight [1] | Polymerization temperature, ° C. | Yield | Viscosity, centipose/ 20° C. |
|---|---|---|---|---|---|---|---|---|
| 27A | 1.25 | 0.642 | 4:1 | Benzene | | 5 | 88 | 520 |
| 27B | 1.25 | 0.214 | 12:1 | ___do___ | | 25 | 89.6 | 2,450 |
| 27C | 1.25 | 0.214 | 12:1 | ___do___ | 0.279 | 25 | 88.3 | 832 |
| 27D | 1.25 | 0.214 | 12:1 | Benzene/hexane [2] | 0.279 | 25 | 86 | 535 |
| 27E | 1.25 | 0.214 | 12:1 | ___do.[2]___ | | 25 | 81 | 1,970 |

[1] Percent by weight relative to butadiene employed.
[2] Proportion by volume 3:1; 51.7 liter of benzene/17.3 liter of hexane.

Example 28

With exclusion of oxygen and humidity of the atmospheric air the catalyst was prepared at room temperature in a 2-liter reaction vessel which was filled with 1000 ml. of carbon tetrachloride with a 18 p.p.m. water content under nitrogen circulation by the addition of 1.54 g. (6 mmol) of nickel-(II)-acetylacetonate and the drop-wise addition of 7.44 g. (60 mmol) of ethylaluminumsesquichloride (Al/Ni ratio 10:1) in the presence of traces the reaction solution of 1.16 g. (12.5 mmol) of aniline dissolved in 20 ml. of carbon tetrachloride. Over a period of five hours and at a temperature of 25° C. there was of butadiene, and subsequent addition drop by drop into introduced continuously in gaseous form and under stirring 324 g. (6 mol) of butadiene(1,3) of the quality as described in Example 1, while at the same time 156 g. (1.5 mol) of styrene was added drop by drop. The stirring was then continued for another hour and then the catalyst was decomposed by use of 20 ml. of methanol.

The inactivated reaction solution was then stirred four times, each time with 2 liter of a .01% acetic acid in order to remove the catalyst residues. The acetic acid, being of less specific weight, was decanted each time after settling of the carbon tetrachloride solution. Finally the carbon tetrachloride with any remaining traces of the acetic acid was removed by distillation in a rotary vacuum evaporator.

The yield was 341 g. (71.0% of the theoretical value) of a liquid polybutadiene-styrene copolymer with a viscosity of 240 centipoise at 50° C., measured in the Hoepler dropping ball viscometer. The iodine number was 379 (94.7% of the theoretically possible value). The infra-red analysis showed that the polymer contained 15 percent by weight of styrene and 85 percent by weight of butadiene. The olefine double bonds are in the form of 73% of centrally-positioned cis-, 26% of centrally-positioned trans- and <1% of vinyl-double bonds. The molecular weight was 1300 (vapour pressure osmometer), the density $(d50/4):0.9179$ and the refractive index $(n_D^{20}):1.5379$.

Example 29

For purposes of comparison the polymerization was carried out under conditions analogous to the conditions described in Example 28, the only difference being that the catalyst was not modified by aniline.

After introduction and drop-wise addition respectively, of 280 g. (5.18 mol) of butadiene and 116 g. (1.11 mol) of styrene (220 minutes after the start of the polymerization) the liquid polymer which had formed up to this time become suddenly high-molecular and precipitated from the solution. The polymerization process was then stopped.

I claim:
1. Process for the preparation of low-molecular weight liquid polybutadienes, low-molecular weight liquid butadiene/diene and low-molecular weight liquid butadiene/styrene copolymers with predominantly intermediate double bonds and viscosities ranging from 50 to 30,000 centipoise (50° C.) which comprises polymerizing a member selected from the group consisting of butadiene, mixtures of butadiene and conjugated diolefines with more than 4 carbon atoms and mixtures of butadiene and styrene and substituted styrenes in an inert diluent in the presence of a mixed catalyst formed by reacting (1) a nickel compound which is soluble in said diluent with (2) an alkylaluminum halide of the formula

$$R_nAlX_{(3-n)}$$

in which R represents a member selected from the group consisting of hydrogen, alkyl, aryl and alkylaryl residues with 1 to 12 carbon atoms, X stands for halogen and $n$ stands for a number from .5 to 2.5, and adding to the reaction product a compound of an element selected from the group consisting of the main groups V and VI of the periodic system, said compound having a free electron pair being derived from said selected elements.

2. Process according to claim 1 in which the diluent is a halogen substituted hydrocarbon.

3. Process according to claim 1 in which the diluent is a member selected from the group consisting of carbon tetrachloride, chloroform and methylene chloride.

4. Process as defined in claim 1 in which said element is a member selected from the group consisting of nitrogen, phosphorus, sulfur and oxygen.

References Cited

UNITED STATES PATENTS 3,228,917   1/1966   Childers _____ 260—94.3
3,271,468   9/1966   Wilke et al. _____ 260—668

DELBERT E. GANTZ, Primary Examiner.

CURTIS R. DAVIS, Assistant Examiner.

U.S. Cl. X.R.

260—680, 93.5, 94.3